United States Patent
Kay

(10) Patent No.: US 11,654,312 B2
(45) Date of Patent: May 23, 2023

(54) SHOULDER HARNESS

(71) Applicant: Weston Kay, Mona, UT (US)

(72) Inventor: Weston Kay, Mona, UT (US)

(*) Notice: Subject to any disclaimer, the term of this patent is extended or adjusted under 35 U.S.C. 154(b) by 216 days.

(21) Appl. No.: 16/869,623

(22) Filed: May 8, 2020

(65) Prior Publication Data
US 2020/0353297 A1    Nov. 12, 2020

Related U.S. Application Data

(60) Provisional application No. 62/845,124, filed on May 8, 2019.

(51) Int. Cl.
*A45F 3/14* (2006.01)
*A62B 35/00* (2006.01)
*A45F 5/02* (2006.01)

(52) U.S. Cl.
CPC .......... *A62B 35/0025* (2013.01); *A45F 5/02* (2013.01)

(58) Field of Classification Search
CPC .......... A45F 5/00; F41C 23/02; F41C 33/002; A62B 35/0025
USPC .......... 224/647, 651, 637, 627, 600
See application file for complete search history.

(56) References Cited

U.S. PATENT DOCUMENTS

| | | | | |
|---|---|---|---|---|
| 42,895 A * | 5/1864 | Woods | ...... | A45F 3/04 224/250 |
| 3,081,923 A * | 3/1963 | Bagby | ...... | F41C 33/003 224/264 |
| 3,258,182 A * | 6/1966 | McDonald | ...... | F41C 33/002 D2/626 |
| 5,016,797 A * | 5/1991 | Rowledge | ...... | A45F 5/00 224/907 |
| 5,775,558 A * | 7/1998 | Montalbano | ...... | A45F 3/14 224/675 |
| 5,816,460 A * | 10/1998 | Cook | ...... | A45F 3/14 224/604 |
| 5,881,487 A * | 3/1999 | Chalker | ...... | F41C 23/02 42/85 |
| 5,915,606 A * | 6/1999 | Jensen | ...... | B44D 3/14 224/259 |
| 6,065,658 A * | 5/2000 | Hashimoto | ...... | A45F 3/14 224/904 |
| 6,315,179 B1 * | 11/2001 | Hillis | ...... | A45F 3/14 224/268 |
| 7,857,181 B2 * | 12/2010 | Sacks | ...... | A45F 3/14 224/579 |
| 9,587,908 B2 * | 3/2017 | Bjelde | ...... | F41C 33/007 |
| 10,088,272 B2 * | 10/2018 | Echevarria | ...... | F41C 33/002 |
| 2003/0213823 A1 * | 11/2003 | Papovitch | ...... | A45F 5/02 224/269 |
| 2010/0206921 A1 * | 8/2010 | Shen | ...... | F41C 33/002 224/150 |
| 2011/0309123 A1 * | 12/2011 | Ashenafi | ...... | A45F 3/14 224/627 |

(Continued)

*Primary Examiner* — Robert Sandy
*Assistant Examiner* — Michael Slee
(74) *Attorney, Agent, or Firm* — Ray Quinney & Nebeker P.C.; Thomas L. Lingard

(57) ABSTRACT

A harness includes a shoulder support having a back member, a shoulder strip, an underarm strip, and a chest strip. The underarm strip and the chest strip connect to an underarm connection. A tether connects to the underarm connection at a tether first end. At a tether second end, a tool connection is configured to connect to a tool and a support connection is configured to connect to a user.

12 Claims, 9 Drawing Sheets

(56) References Cited

U.S. PATENT DOCUMENTS

| | | | |
|---|---|---|---|
| 2012/0292363 A1* | 11/2012 | Crawford | ............... A45F 5/02 |
| | | | 224/655 |
| 2015/0168097 A1* | 6/2015 | Echevarria | ............ F41C 33/002 |
| | | | 224/150 |
| 2019/0033035 A1* | 1/2019 | Echevarria | ............ F41C 33/002 |

* cited by examiner

SHOULDER HARNESS

CROSS-REFERENCE TO RELATED APPLICATIONS

This application claims priority to and the benefit of U.S. Provisional Patent Application No. 62/845,124, filed on May 8, 2019, which are hereby incorporated by reference in their entireties.

BACKGROUND

Background and Relevant Art

Tools are often carried on straps that are supported by a portion of a user's body. Some straps are made into harnesses that may transfer all or a portion of the tool's weight to a specific portion of the user's body when the user is not holding the tool in his hands. Often straps or harnesses are worn for long periods of time, or in rugged terrain where a user's hands are needed for safe travel.

BRIEF SUMMARY

In some embodiments, a harness includes a shoulder support and a tether connected to the shoulder support. The tether includes an attachment and a support connector.

In other embodiments, a harness includes a first shoulder support and a second shoulder support. The first shoulder support and the second shoulder support are connected at a back pivot member. A tether is connected to the first shoulder support or the second shoulder support, and the tether includes a tool attachment and a support connector.

In yet other embodiments, a harness includes a shoulder support including: a back member, a shoulder strip, an underarm strip, and a chest strip. The shoulder strip is removably connected to the back member at a shoulder tab. The underarm strip is removably connected to the back member at an arm tab. The chest strip is removably connected to the shoulder strip. The chest strip and the underarm strip are removably connected to an underarm connection. A tether is removably connected to the underarm connection, and the tether includes a tool attachment and a support connector.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 1-2 is a back view of the harness of FIG. 1-1, according to at least one embodiment of the present disclosure;

FIG. 1-3 is a side view of the harness of FIG. 1-1, according to at least one embodiment of the present disclosure;

FIG. 2 is a front view of a harness, according to at least one embodiment of the present disclosure;

FIG. 3-1 is front view of another harness, according to at least one embodiment of the present disclosure;

FIG. 3-2 is a back view of the harness of FIG. 3-1, according to at least one embodiment of the present disclosure;

DETAILED DESCRIPTION

This disclosure generally relates to harnesses for use with a tool. Throughout this disclosure, reference may be made to a camera or photography-related tools and equipment that may be used in conjunction with the harness. However, it should be understood that the harness may be used with any tool, such as a drill, a firearm (e.g., a handgun), a hammer, and so forth. References to a camera and camera equipment are used as examples and should not be considered to limit this disclosure solely for use with cameras.

Prior harnesses may place pressure on a user's neck, shoulders, and arms. This pressure may cause discomfort and pain to the user. The pressure may be caused by poorly fitting harnesses that fail to transfer the weight of a tool to stronger parts of a user's body, such as the upper back and hips. Furthermore, prior harnesses may include sliding or moving connections between the harness and the tool, which may snag on a user's clothes, skin, and/or hair.

Figure 1:
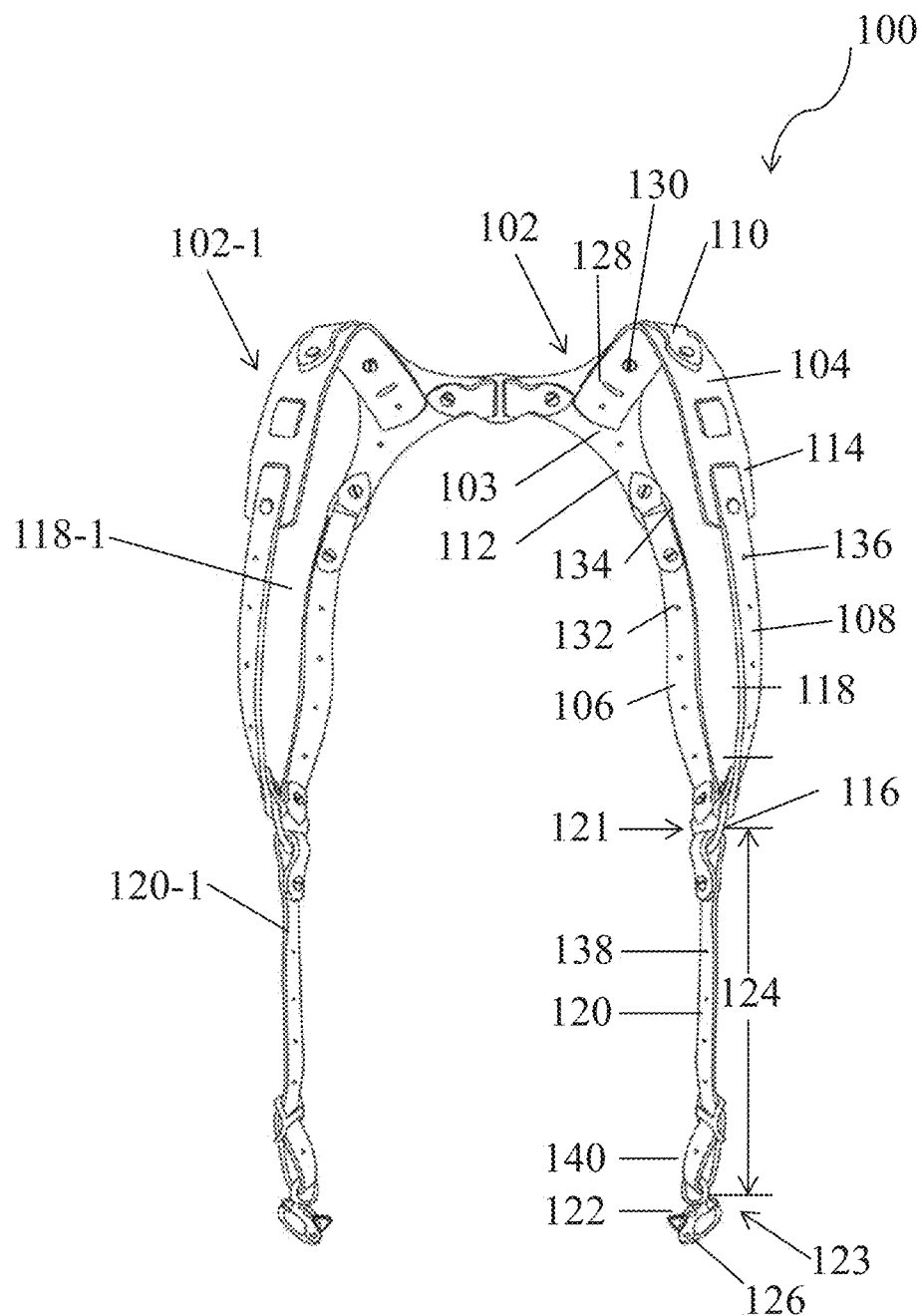
FIG. 1-1 is a front view of a harness, according to at least one embodiment of the present disclosure.

FIG. 1-1 is a front view of a representation of a harness 100, according to at least one embodiment of the present disclosure. The harness 100 may include a shoulder support 102. The shoulder support 102 may include a back member 103, a shoulder strip 104, an underarm strip 106, and a chest strip 108. The shoulder strip 104 may be connected to the shoulder support 102 at a shoulder tab 110. The underarm strip 106 may be connected to the shoulder support 102 at an arm tab 112. The chest strip 108 may be connected to the shoulder strip 104 at a chest connection 114.

The underarm strip 106 and the chest strip 108 may be connected at an underarm connection 116. In this manner, an armhole 118 may be created by the shoulder support 102. In other words, the armhole 118 may be created by an outline of a back member 103, the shoulder strip 104, the underarm strip 106, and the chest strip 108. A user's arm may be inserted into the armhole 118 such that the back member 103 rests approximately against the shoulder blade, the shoulder strip 104 reaches up around the shoulder, and the chest strip 108 arches across the side of the chest where it meets the underarm strip 106 near the underarm of the user. In some embodiments, the shoulder support 102 may fit snugly to a user's body. In other words, a majority of a length of each component of the shoulder support 102 may remain in physical contact with the user's body during use.

A tether 120 may be connected to the shoulder support 102 at the underarm connection 116 at a tether first end 121. In some embodiments, the underarm connection 116 may be a ring, such as a circular, triangular, square, or a D-ring. In some embodiments, the ring may be a metal ring, a plastic ring, a cloth ring, a leather ring, or any other type of ring. In other embodiments, the underarm connection 116 may be a leather pad that includes holes through which the underarm strip 106, the chest strip 108, and the tether 120 may be inserted. In still other embodiments, the underarm connection 116 may be some combination of the foregoing. In some embodiments, the underarm connection 116 may be triangular in shape. In other embodiments, the underarm connection 116 may be circular, square, rectangular, polygonal of any number sides, non-polygonal, or irregularly shaped. In still other embodiments, the underarm connection 116 may be made from any material, such as a natural material (e.g., leather, cotton, wool, hemp, bamboo), a textile, a woven fabric, a synthetic fabric (e.g., nylon, polyester, acrylic, polyolefin), and combinations of the foregoing.

In some embodiments, any portion of the harness 100, such as the back member 103, the shoulder strip 104, the underarm strip 106, the chest strip 108, the tether 120, and any other portion of the harness 100, may be fabricated from leather. In other embodiments, any portion of the harness 100 may be fabricated from any other suitable material, such as a natural material (e.g., leather, cotton, wool, hemp, bamboo), a textile, a woven fabric, or a synthetic fabric (e.g., nylon, polyester, acrylic, polyolefin). Different materials have different qualities, such as durability, strength, cost, comfort, breathability, softness, and so forth. The material selected may be selected to optimize these qualities. For example, leather is durable, strong, and soft. In other examples, synthetic fabric may be durable and cheap. In yet other examples, cotton may be soft and water-absorbent.

In some embodiments, each component of the harness 100 may be fabricated from the same material. In other embodiments, different components of the harness 100 may be fabricated from different materials. For example, components that may put pressure or rub on a user, such as the shoulder strip 104, the chest strip 108, or the underarm strip 106, may be fabricated from a relatively softer material than other portions. Alternatively, in some examples, components may include multiple materials, such as a base of a durable material, and a liner of a soft material. In other examples, components that experience high wear, such as the tether 120, may be made from a relatively more durable material. In yet other examples, different components may be fabricated from different materials for any reason, including user preference, aesthetics, price, availability, or functionality.

The tether 120 may include a tool attachment 122 at a tether second end 123. The tool attachment 122 may be configured to attach to a hand tool, such as a camera. In this manner, a user may let go of the tool with her hands, without setting it down or being physically separated from it. When the user wishes to use the tool, such as to take a picture, she may simply reach down to the end of the tether 120 and pick it up.

The tether 120 has a tether length 124, which may be measured from the underarm connection 116 to the tool attachment 122. In some embodiments, the tether length 124 may be such that a user may use the tool as intended without interference by the tether 120. For example, the tether length 124 may allow a user to lift a camera to her face to take a picture. Therefore, the tether length 124 must be the same as or longer than the distance from the user's underarm to the user's eyes. Prior harnesses may utilize a sliding connection along an arm loop, which may catch in the hair, skin, and/or clothing of a user, or may catch on the harness itself. A tether 120 fixed to an underarm connection 116 and a tool does not have a sliding connection, and therefore may allow a user to easily and quickly access and use the tool, without a sliding mechanism to catch on anything.

The tether 120 may include a support connector 126 at the tether second end 123. In some embodiments, the support connector 126 may connect to the tool through the tool attachment 122. In other embodiments, the support connector 126 may connect to the tool at a different location than the tool attachment 122. The support connector 126 may be configured to connect to a user and transfer at least a portion of the weight of the tool to his body. For example, the support connector 126 may be a clip that may connect to the user's pants, such as at a waist, a belt, a belt loop, a pocket, and so forth. In another example, the support connector 126 may be a clip that may connect to the user's shirt, such as at a button, a collar, a sleeve, by pinching the fabric of the shirt, and so forth. In this manner, the weight of the tool may be removed from the user's shoulders and transferred to a stronger part of the user.

Transferring the weight of the tool may reduce the fatigue and soreness the user experiences during extended periods of use of the tool. For example, a photographer may have an extended photoshoot, such as at a wedding. Weddings are typically all-day or even multi-day events, and the weight of a single or multiple cameras on the photographer's shoulders may fatigue, or even injure, her neck, shoulders, and/or back. By transferring the weight of the camera to the user's hips, the photographer may significantly reduce the fatigue, soreness, and strain on the other parts of her body. This may improve the photographer's performance, extend the length of a photoshoot, or even extend the length of her career by making long photoshoots more physically manageable.

To connect to the user, the tether 120 may have a tether length 124 that is sufficiently long to reach the portion of the user to which the support connector 126 may connect. For example, the tether length 124 may be at least a distance between the underarm connection 116 and the user's waist when the support connector 126 connects to his waist. However, the tether length 124 may be longer than the minimum necessary to connect the support connector 126 to the user. For example, if the distance from the underarm connection 116 to the user's waist is shorter than the distance from the underarm connection 116 to the user's eyes, then the tether length 124 may be the distance from the underarm connection 116 to the user's eyes, to facilitate use of the tool. In other words, the tether length 124 may be the longer of the length needed to use the tool and the length needed to connect the tool to the user. In other embodiments, the tether length 124 may be longer or shorter than the lengths described above.

In some embodiments, elements or components of the harness 100 may be adjustable. In this manner, the harness 100 may be adjustable to fit a variety of users having a variety of body sizes, shapes, needs, and preferences. In some embodiments, each of the elements of the harness 100 may be adjustable. In other embodiments, one or a combination of some, but not all, of the elements of the harness 100 may be adjustable.

The shoulder strip 104 may include a plurality of shoulder strip connection points 128. A removable rivet 130 may connect the shoulder strip 104 to the shoulder tab 110 through connection points in the shoulder tab 110 (not shown). By connecting the shoulder strip 104 to the shoulder tab 110 with the removable rivet 130 at different shoulder strip connection points 128, the shoulder length of the shoulder strip 104 may be adjusted. In some embodiments, the shoulder tab 110 may be connected to the shoulder strip 104 at a single location. For example, the shoulder tab 110 may be connected to the shoulder tab 110 using a buckle similar to the arm buckle 134 discussed below. In other embodiments, the shoulder tab 110 may be connected to the shoulder strip 104 in two locations, or more than two locations. In still other embodiments, the shoulder strip 104 may connect to the shoulder tab 110 with a strap; a pull-through strap adjuster, such as a locking cam or a backpack strap buckle, may be used to adjust the shoulder length of the shoulder strip 104.

The underarm strip 106 may include a plurality of arm connection holes 132. In some embodiments, the arm tab 112 may connect to the underarm strip 106 at an arm buckle 134. The arm buckle 134 may be a circular, square, rectangular, polygonal, or D-ring shaped connector. The arm tab 112 may loop through the arm buckle 134 and connect back to itself using a removable rivet 130 inserted through holes in the arm tab 112. Similarly, the underarm strip 106 may loop through the arm buckle 134 and connect back on itself through a removable rivet 130 inserted through two of the plurality of arm connection holes 132. By pulling more of the underarm strip 106 through the arm buckle 134 and connecting two of the plurality of arm connection holes 132 that are further apart, the underarm length of the underarm strip 106 may be reduced. In other embodiments, the underarm strip 106 may connect directly to the arm tab 112 using a removable rivet 130. In still other embodiments, the underarm strip 106 may connect to the arm tab 112 with a strap; a pull-through strap adjuster, such as a locking cam or a backpack strap buckle, may be used to adjust the underarm length of the underarm strip 106.

The chest strip 108 may include a plurality of chest connection holes 136. In some embodiments, the chest strip 108 may connect to the shoulder strip 104 with a removable rivet 130 through one of the plurality of chest connection holes 136 and a hole in the shoulder strip (not shown). The extra length of the chest strip 108 may be threaded through the shoulder strip 104. In this manner, the connection between the chest strip 108 and the shoulder strip 104 may be relatively flat, and be relatively smooth against the user's chest. In other embodiments, the chest strip 108 may connect to the shoulder strip 104 using a similar buckle as the arm buckle 134. In still other embodiments, the chest strip 108 may connect to the shoulder strip 104 with a strap; a pull-through strap adjuster, such as a locking cam or a backpack strap buckle, may be used to adjust a chest length of the chest strip 108.

The underarm strip 106 and the chest strip 108 may connect to the underarm connection 116 in a similar manner as the connection between the underarm strip 106 and the arm buckle 134. For example, the underarm strip 106 may pass through a portion of the underarm connection 116 and a removable rivet 130 may pass through two of the plurality of arm connection holes 132. By passing the removable rivet 130 through two arm connection holes 132 that are further apart from each other, the underarm strip 106 may be shortened. Similarly, the chest strip 108 may pass through a portion of the underarm connection 116 and a removable rivet 130 may pass through two of the plurality of chest connection holes 136. By passing the removable rivet 130 through two chest connection holes 136 that are further apart from each other, the chest strip 108 may be shortened. In other embodiments, the underarm strip 106 and/or the chest strip 108 may directly connect to the underarm connection 116 using a removable rivet 130. In still other embodiments, the underarm strip 106 and/or the chest strip 108 may connect to the underarm connection 116 with a strap; a pull-through strap adjuster, such as a locking cam or a backpack strap buckle, may be used to adjust a length of the underarm strip 106 and/or the chest strip 108.

The tether 120 may include a plurality of tether connection holes 138. The tether 120 may connect to the underarm connection 116 in a similar manner as the connection between the underarm strip 106 and the arm buckle 134. For example, the underarm strip 106 may pass through a portion of the underarm connection 116 and a removable rivet 130 may pass through two of the plurality of arm connection holes 132. By passing the removable rivet 130 through two arm connection holes 132 that are further apart from each other, the underarm strip 106 may be shortened. In other embodiments, the tether 120 may directly connect to the underarm connection 116 using a removable rivet 130. In still other embodiments, the tether 120 may connect to the underarm connection 116 with a strap; a pull-through strap adjuster, such as a locking cam or a backpack strap buckle, may be used to adjust a length of the tether 120.

The tool attachment 122 and/or the support connector 126 may connect to the tether second end 123 at a tether connection 140. In some embodiments, the tether connection 140 may be a loop at the tether second end 123, formed by looping the tether 120 through a lay-flat buckle. In other embodiments, the tether connection 140 may be formed by inserting a removable rivet 130 through two of the plurality of tether connection holes 138. In this manner, the tether length 124 may be adjusted from both the tether first end 121 and the tether second end 123. In other embodiments, the tool attachment 122 and/or the support connector 126 may connect to the tether second end 123 using any connection, such as a ring, a D-ring, a loop woven or sewn into the tether 120, or any other connection.

In some embodiments, the shoulder support 102 is a first shoulder support, and the harness 100 may include a second shoulder support 102-1. In some embodiments, the second shoulder support 102-1 may be the same as the first shoulder support (i.e., shoulder support 102), except slightly modified to fit the other shoulder of a user. For example, in the embodiment shown in FIG. 1, the first shoulder support 102 is configured for a user's left arm to be inserted through the armhole 118. The second shoulder support 102-1 may be configured for a user's right arm to be inserted through a second armhole 118-1.

Other features of the second shoulder support 102-1 may be identical or similar to the first shoulder support 102. For example, the second shoulder support 102-1 may include a second tether 120-1. The second tether 120-1 may be configured to hold a tool, similar to the tether 120. For example, the tether 120 may be attached to a first camera, and the second tether 120-1 may be attached to a second camera. In this manner, a photographer may easily switch between cameras having different settings and/or accessories to capture the desired picture. In other examples, the tether 120 may be attached to a camera, and the second tether 120-1 may be attached to a bag, such as a camera bag that includes camera accessories, or another bag that includes items for which it may be desirable to have readily accessible.

In still other examples, the tether 120 and the second tether 120-1 may have different lengths configured for different connections to the user and/or different uses. In yet other examples, the second shoulder support 102-1 may not include a second tether 120-1.

Figures 1, 2:
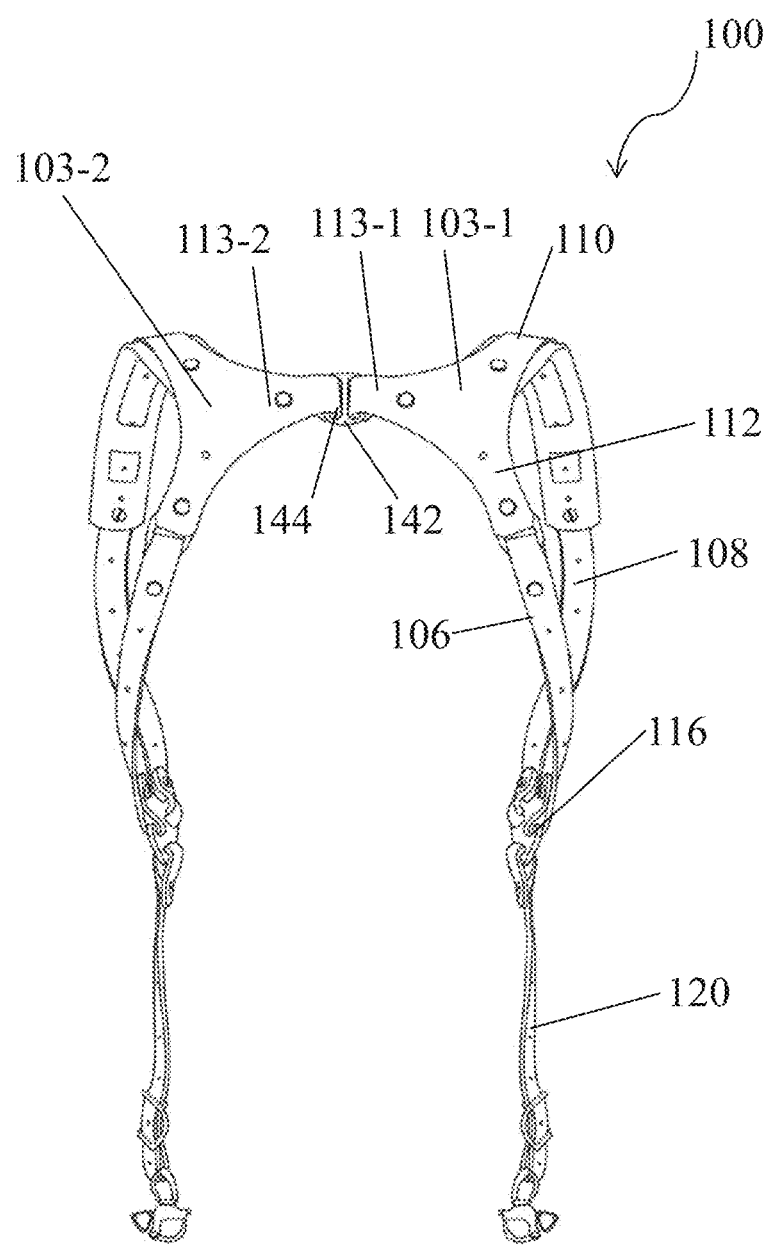

FIG. 1-2 is a back view of the harness 100 shown in FIG. 1-1. The back member 103-1, 103-2 may include a first back member 103-1 and a second back member 103-2. The first back member 103-1 may include a first back tab 113-1 and the second back member 103-2 may include a second back tab 113-2. The first back tab 113-1 may connect to the second back tab 113-2 at a back pivot member 142. In some embodiments, the back pivot member 142 may be a ring, made from a rigid material such as plastic or metal, with the first back tab 113-1 and the second back tab 113-2 being connected to the back pivot member 142 on opposite sides of the back pivot member 142, along an outer circumference of the back pivot member 142. In some embodiments, the back pivot member 142 may be circular, elliptical, square, rectangular, a D-ring, or any other shape such that the first back tab 113-1 and the second back tab 113-2 may connect to it.

In some embodiments, the back pivot member 142 may include a separating bar 144. The separating bar 144 may be a straight or curved bar that divides the back pivot member 142 into two sections, with the first back tab 113-1 being connected to a first section, and the second back tab 113-2 being connected to a second section. In other embodiments, the back pivot member 142 may be a hollow ring, without the separating bar 144.

In some embodiments, the first back tab 113-1 and/or the second back tab 113-2 may be movably or rotationally connected to the back pivot member 142. In other words, the back pivot member 142 may be movable, rotatable, or pivotable relative to the first back member 103-1 and/or the second back member 103-2. For example, the back pivot member 142 may rotate or pivot perpendicular to the plane of the back member 103-1, 103-2. In other examples, the back pivot member 142 may rotate or pivot parallel to the plane of the back member 103-1, 103-2. Rotation or pivoting parallel to the plane of the back member 103-1, 103-2 may be stopped or halted by the separating bar 144. By being movable, rotatable, or pivotable about the back pivot member 142, the harness 100 may move with the user's body. In this manner, forces may be distributed to the strongest points of the user's body as the user moves. Furthermore, this may increase the comfort and ease of use of the harness 100.

In some embodiments, the back member 103-1, 103-2 may be approximately triangular in shape. In other words, the back member 103-1, 103-2 may include three tabs: the shoulder tab 110, the arm tab 112, and a back tab 113-1, 113-2. The back member 103-1, 103-2 between each tab may be curved or arched. For example, the back member 103-1, 103-2 between the shoulder tab 110 and the back tab 113-1, 113-2 may be curved to match the shape of a user's shoulder and/or neck. Similarly, the back member 103-1, 103-2 between the arm tab 112 and the back tab 113-1, 113-2 may be curved to match the shape of the user's back and/or shoulder. Similarly, the back member 103-1, 103-2 between the shoulder tab 110 and the arm tab 112 may be curved to match the user's shoulder and/or arm. In some embodiments, the back member 103-1, 103-2 may be ergonomically shaped to most effectively distribute forces from the shoulder and arm to the back.

The arched or curved shape of the back member 103-1, 103-2 may help to distribute forces to the user's back efficiently. For example, a camera hanging from the tether 120 may transmit the weight from the tether 120 to the underarm connection 116. The weight may then be transferred to the user's shoulders and back through the chest strip 108 and the underarm strip 106. The arch or curve of the back member 103-1, 103-2 may distribute this load evenly across the back, thereby increasing usability and comfort of the harness 100.

Figures 1, 2, 3:
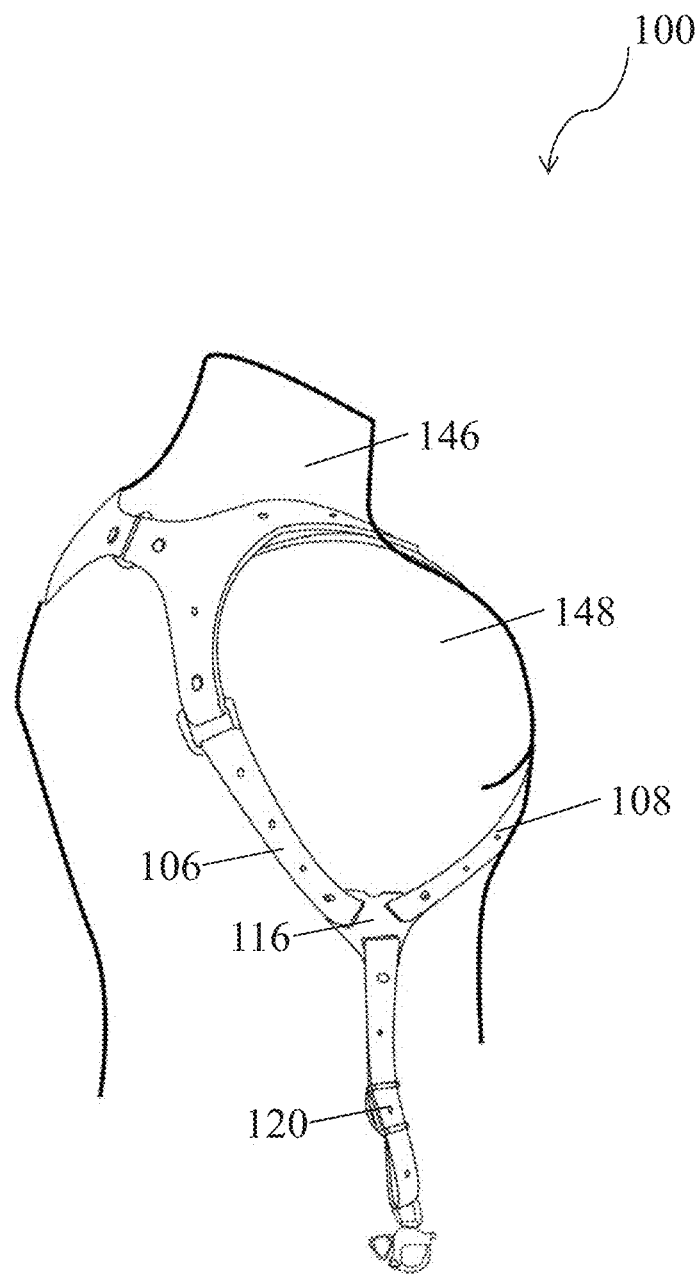
Figure 2:
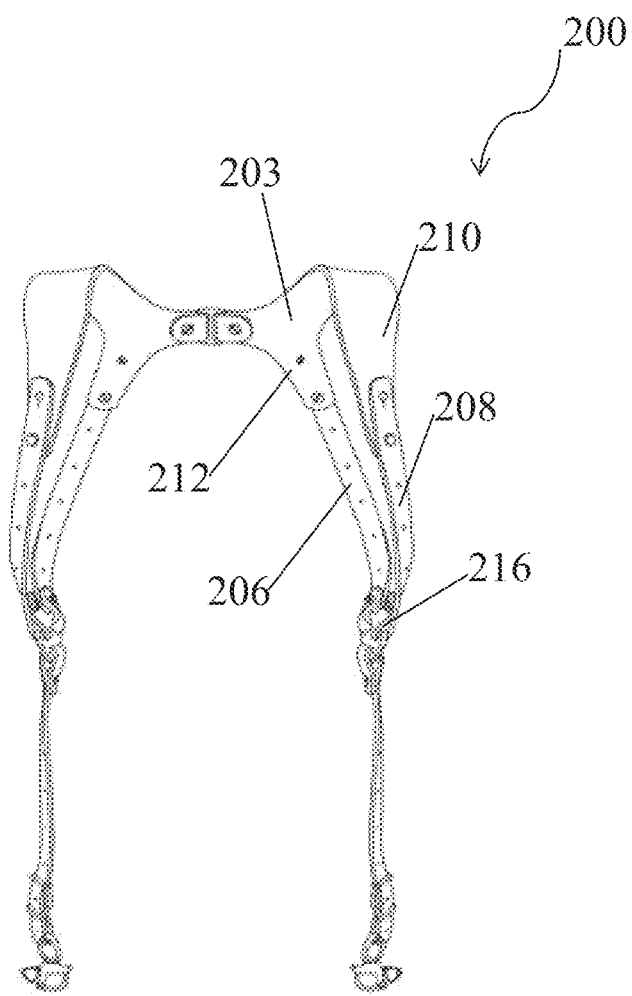
Figures 1, 3:
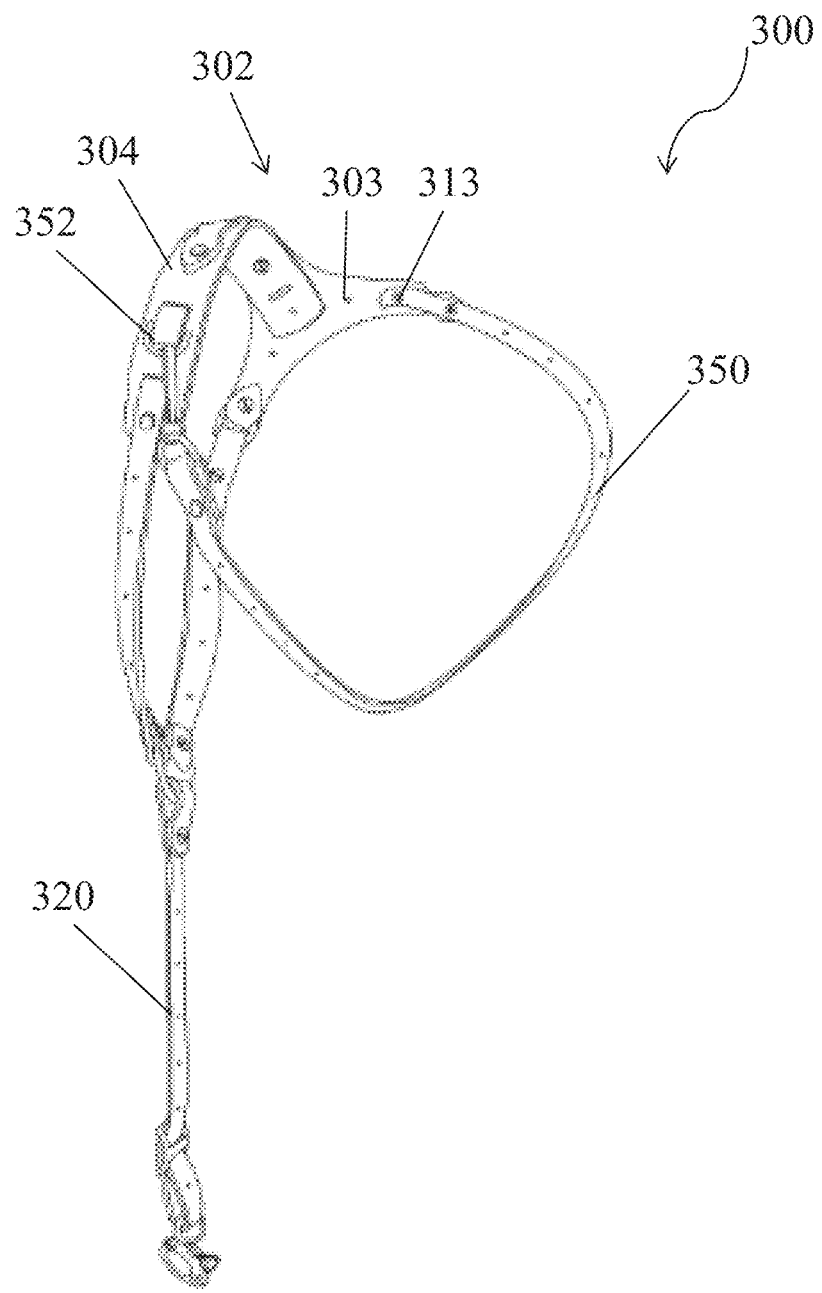
Figures 2, 3:
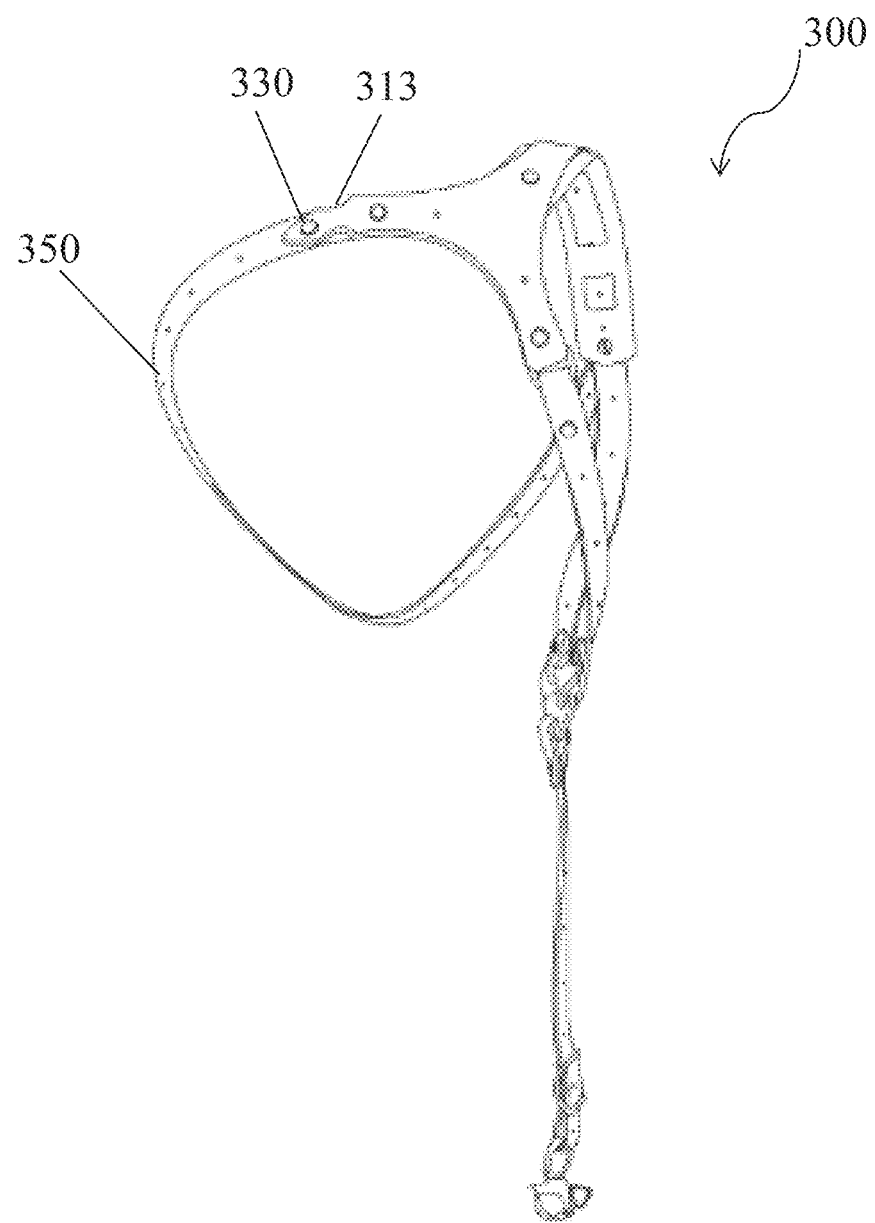

FIG. 1-3 is a side view of the harness 100 of FIG. 1-1, shown as being worn by a mannequin 146. As discussed above, the harness 100 is adjustable by adjusting the length of the chest strip 108 and/or the underarm strip 106. By selectively adjusting the length of the chest strip 108 and the underarm strip 106, the location of the underarm connection 116 relative to a user's shoulder (represented by the mannequin's shoulder 148) may be adjusted. For example, by shortening the underarm strip 106 and lengthening the chest strip 108, the underarm connection 116 may be moved toward the user's back. Conversely, by lengthening the underarm strip 106 and shortening the chest strip 108, the underarm connection 116 may be moved toward the user's chest.

Similarly, by lengthening both the underarm strip 106 and the chest strip 108, the underarm connection 116 may be moved down the user's torso. Conversely, by shortening both the underarm strip 106 and the chest strip 108, the underarm connection 116 may be moved up the user's torso. Thus, the location of the underarm connection 116, and therefore the distribution of forces from the tether 120, may be adjusted according to the user's body shape, body size, preferences, and comfort.

FIG. 2 is a front view of an embodiment of a harness 200, according to at least one embodiment of the present disclosure. In some embodiments, the back member 203 may connect directly to the chest strip 208 at the shoulder tab 210, without a shoulder strip (e.g., without the shoulder strip 104 of FIG. 1-1). This may reduce the complexity and the cost of the harness 200.

In other embodiments, the back member 203 may connect directly to the underarm connection 216. For example, the back member 203 may have a shoulder tab 210 that is long enough to connect directly to the underarm connection 216, without the chest strip 208. In other examples, the back member 203 may have an arm tab 212 that connects directly to the underarm connection 216, without an underarm strip 206. This may further reduce the complexity and cost of the harness.

FIG. 3-1 is a front view of an embodiment of a harness 300, according to at least one embodiment of the present disclosure. The harness 300 may include a single shoulder support 302. In other words, the harness 300 may comprise one, or only one, shoulder support 302. A user that only needs a single tether 320 to carry a single tool, or several tools on a single tether 320, may only need a single shoulder support. This may reduce the cost, as well as improve comfort and usability for the user. In some embodiments, the shoulder support 302 may be configured for use on either a right shoulder or a left shoulder of the user.

The shoulder support 302 may include a back member 303 and a chest connector 350. The chest connector 350 may be connected to the back member 303 at a back tab 313. The chest connector 350 may loop around a user's body, underneath the opposite arm, and connect to the shoulder strip 304 at a chest ring 352. The chest ring 352 may be a metal ring, a plastic ring, a loop, a D-ring, a Velcro connection, a button, a snap, a buckle, or any other connection. In other embodiments, the chest connector 350 may connect to the chest ring 352 with a strap; a pull-through strap adjuster, such as a locking cam or a backpack strap buckle, may be used to adjust a length of the chest connector 350. The chest connector 350 may therefore keep the shoulder support 302 in place, or keep the shoulder support 302 from falling off a user's arm during use.

FIG. 3-2 is a back view of the harness 300 of FIG. 3-1. The chest connector 350 may be connected to the back tab 313 using one or more holes in the chest connector 350 and the back tab 313 and a removable rivet 330 extended through both holes. In some embodiments, the length of the chest connector 350 may be adjustable by adjusting through which hole the removable rivet 330 is installed. In other embodiments, the chest connector 350 may connect to the back tab 313 with a strap; a pull-through strap adjuster, such as a locking cam or a backpack strap buckle, may be used to adjust a length of the chest connector 350.

Figure 4:
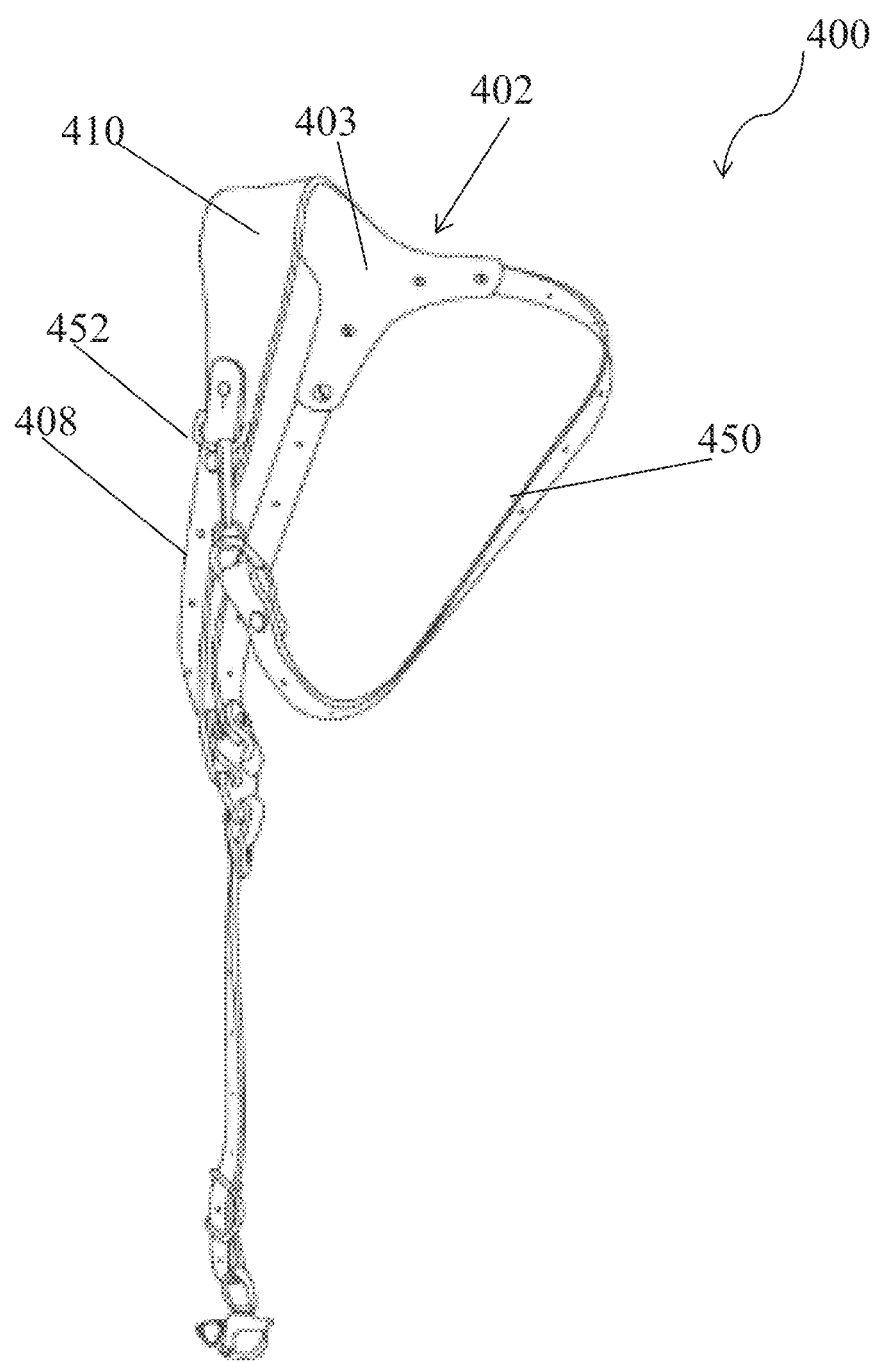
FIG. 4 is a front view of yet another harness, according to at least one embodiment of the present disclosure.

FIG. 4 is a representation of an embodiment of a harness 400, according to at least one embodiment of the present disclosure. In the embodiment shown, the harness 400 includes a shoulder support 402 with a back member 403 that has a shoulder tab 410 that connects directly to the chest strip 408. The harness 400 may only include a single shoulder support 402. A chest connector 450 may connect the back member 403 to the shoulder tab 410 at a chest ring 452, similar to the embodiment described above with respect to FIG. 3-1.

Figure 5:
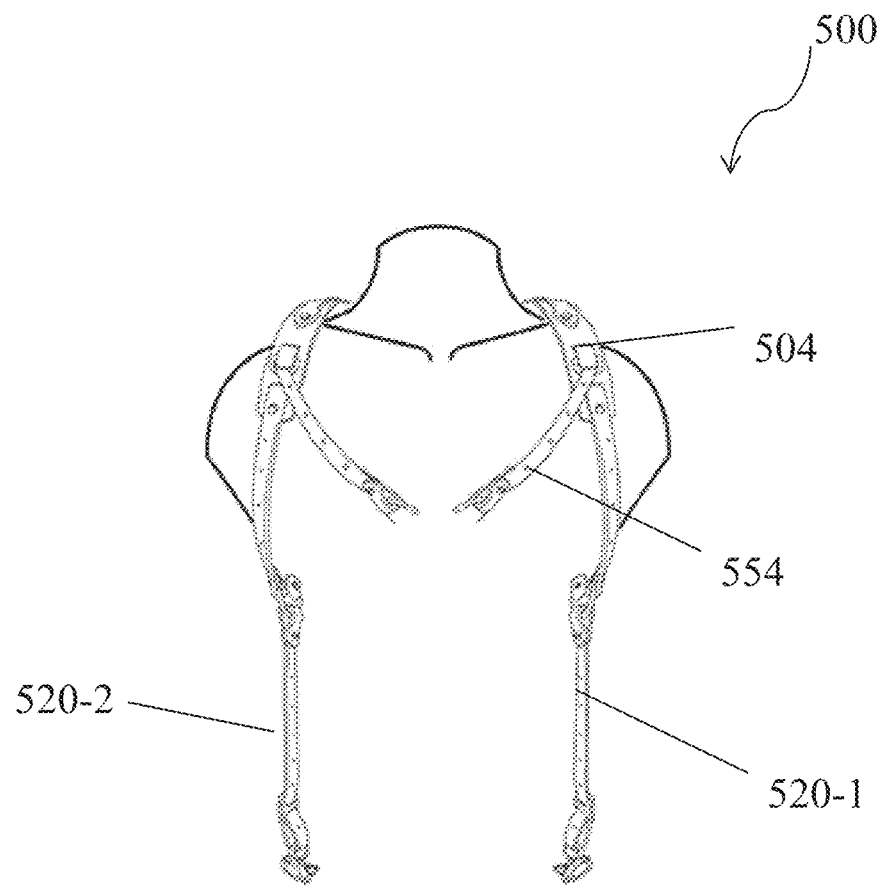
FIG. 5 is a front view of still another harness, according to at least one embodiment of the present disclosure.

FIG. 5 is a representation of an embodiment of a harness 500, according to at least one embodiment of the present disclosure. The harness 500 may include one or more chest tethers 554. The chest tethers 554 may be connected to a shoulder strip 504. The chest tethers 554 may be configured to suspend a tool on the chest of a user. In the embodiment shown, the harness 500 includes two tethers 520-1, 520-2. In this manner, a user may carry up to three tools using the harness 500.

Figure 6:
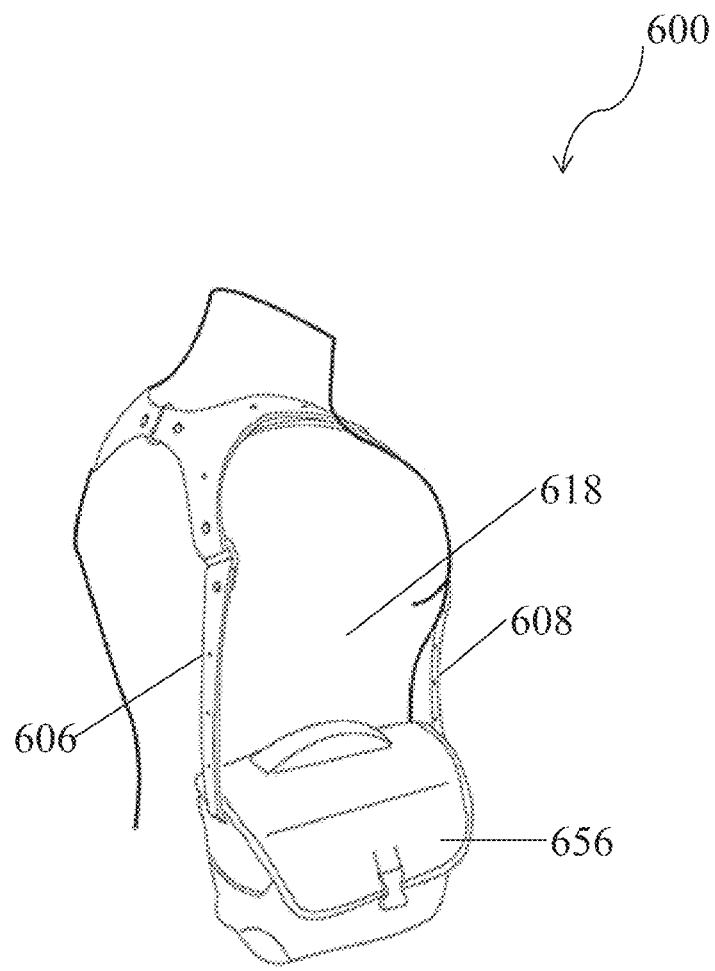
FIG. 6 is a side view of a further harness, according to at least one embodiment of the present disclosure.

In some embodiments, the harnesses of the present disclosure may be modular. In this manner, any feature of any of the figures may connect to or be combined with any other feature, either in the same figure or in another figure. In this manner, a user may customize and optimize the harnesses to a specific use. For example, FIG. 6 shows an embodiment of a harness 600 wherein an underarm strip 606 and a chest strip 608 do not meet at an underarm connection (e.g., underarm connection 116 of FIG. 1-1), but rather are both connected to a bag 656, which forms the armhole 618. This bag 656 may be a camera bag, a lunch bag, or any other storage back. Connecting the bag 656 to the harness 600 may make it easily accessible for the user. Connecting the bag 656 in this manner allows the underarm strip 606 and chest strip 608 to function as a tether to support the bag 656 as the tether 120, described in relation to FIG. 1-1 through FIG. 1-3, supports a tool.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A harness, the harness comprising:
a first shoulder support including a first back member;
a second shoulder support including a second back member;
a back pivot member, the first back member being connected to the back pivot member and the second back member being connected to the back pivot member, the back pivot member including a separating bar separating the back pivot member into a first section and a second section, the first back member being connected to the first section and the second back member being connected to the second section;
a tether including a tether first end and a tether second end, the tether first end being connected to the first shoulder support or the second shoulder support;
a tool attachment connected to the tether second end; and
a support connector connected to the tether second end.

2. The harness of claim 1, wherein first shoulder support includes a first underarm strip and a first chest strip, the first underarm strip and the first chest strip forming a first arm loop, and wherein the second shoulder support includes a second underarm strip and a second chest strip, the second underarm strip and the second chest strip forming a second arm loop.

3. The harness of claim 2, wherein the tether is connected to the first shoulder support at a first underarm connection or the second shoulder support at a second underarm connection.

4. The harness of claim 1, wherein the first back member and the second back member are movably attached to the back pivot member along a circumference of the back pivot member.

5. The harness of claim 1, wherein the tether is a first tether connected to the first shoulder support, and further comprising a second tether connected to the second shoulder support at a second tether first end, the second tether including a second tool attachment and a second support connector at a second tether second end.

6. The harness of claim 1, further comprising a first chest tether and a second chest tether, the first chest tether attached to a first shoulder strip of the first shoulder support, the second chest tether attached to a second shoulder strip of the second shoulder support.

7. The harness of claim 1, wherein the first shoulder support and the second shoulder support have an arched shape, the arched shape receiving forces from a tool connected to the tool attachment and transferring the forces evenly across a user's back.

8. A harness, comprising:
a shoulder support, the shoulder support including:
a back member including a shoulder tab, a back tab, and an arm tab, the back member being curved between the shoulder tab and the back tab, the back tab and the arm tab, and the arm tab and the shoulder tab;
a shoulder strip removably connected to the shoulder tab;
an underarm strip removably connected to the arm tab;
a chest strip removably connected to the shoulder strip, wherein the underarm strip and the chest strip are removably connected at an underarm connection;
a tether removably connected to the underarm connection, the tether including:
a tool attachment; and
a support connector.

9. The harness of claim 8, wherein the shoulder strip includes a plurality of shoulder strip connection points such that a shoulder length between the shoulder tab and the chest strip is adjustable.

10. The harness of claim 8, wherein the arm strip includes a plurality of arm connection holes such that an underarm length between the arm tab and the underarm connection is adjustable.

11. The harness of claim 8, wherein the chest strip includes a plurality of chest connection holes such that a chest length between the shoulder strip and the underarm connection is adjustable.

12. The harness of claim 8, wherein the tether includes a plurality of tether connection holes such that a tether length between the underarm connection and the support connector is adjustable.

* * * * *